United States Patent
De Kok et al.

(10) Patent No.: US 10,258,059 B2
(45) Date of Patent: Apr. 16, 2019

(54) AROMA-RETAINING SOLUBLE COFFEE

(71) Applicant: Koninklijke Douwe Egberts B.V., Utrecht (NL)

(72) Inventors: Petrus Maria Theresia De Kok, Utrecht (NL); Alexander Oosterveld, Utrecht (NL); Gertjan Heijman, Utrecht (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 233 days.

(21) Appl. No.: 15/189,621

(22) Filed: Jun. 22, 2016

(65) Prior Publication Data

US 2016/0302437 A1   Oct. 20, 2016

Related U.S. Application Data

(63) Continuation of application No. PCT/NL2014/050903, filed on Dec. 23, 2014.

(30) Foreign Application Priority Data

Dec. 23, 2013 (EP) .................... 13199299

(51) Int. Cl.
  *A23F 5/40* (2006.01)
  *A23F 5/46* (2006.01)

(52) U.S. Cl.
  CPC ............... *A23F 5/405* (2013.01); *A23F 5/46* (2013.01)

(58) Field of Classification Search
  None
  See application file for complete search history.

(56) References Cited

U.S. PATENT DOCUMENTS

| | | | |
|---|---|---|---|
| 1,836,931 A | 12/1931 | Meyer et al. | |
| 4,857,351 A * | 8/1989 | Neilson | A23F 5/04 426/388 |
| 6,045,843 A * | 4/2000 | Gurol | A23F 5/14 426/309 |

FOREIGN PATENT DOCUMENTS

| | | |
|---|---|---|
| EP | 0 144 785 A2 | 6/1985 |
| EP | 0 352 842 | 1/1990 |
| EP | 0 560 609 A1 | 9/1993 |
| EP | 1 522 223 A1 | 4/2005 |
| WO | WO 2007/043873 | 4/2007 |

OTHER PUBLICATIONS

How Products are Made: Flavored Coffee Bean; published online at least by Aug. 19, 2006 at: https://web.archive.org/web/20060819044135/http://www.madehow.com/Volume-3/Flavored-Coffee-Bean.html (Year: 2006).*
International Search Report and Written Opinion, PCT/NL2014/050903, Koninklijke Douwe Egberts B.V., 8 pages (dated Mar. 6, 2015).

* cited by examiner

*Primary Examiner* — Patricia A George
(74) *Attorney, Agent, or Firm* — Foley & Lardner LLP

(57) ABSTRACT

Disclosed is a novel instant coffee comprising aromatized soluble particles and a method of aromatizing soluble coffee particles. The soluble coffee particles are mixed with roast whole beans, and the mixture is held for at least two days. The result is aromatized soluble coffee particles, as evidenced by the presence of relatively high amounts of 2-methylpyrazine in instant coffee comprising said particles. The instant coffee has a favorable content in aroma components, yet with a low oil content.

12 Claims, 1 Drawing Sheet

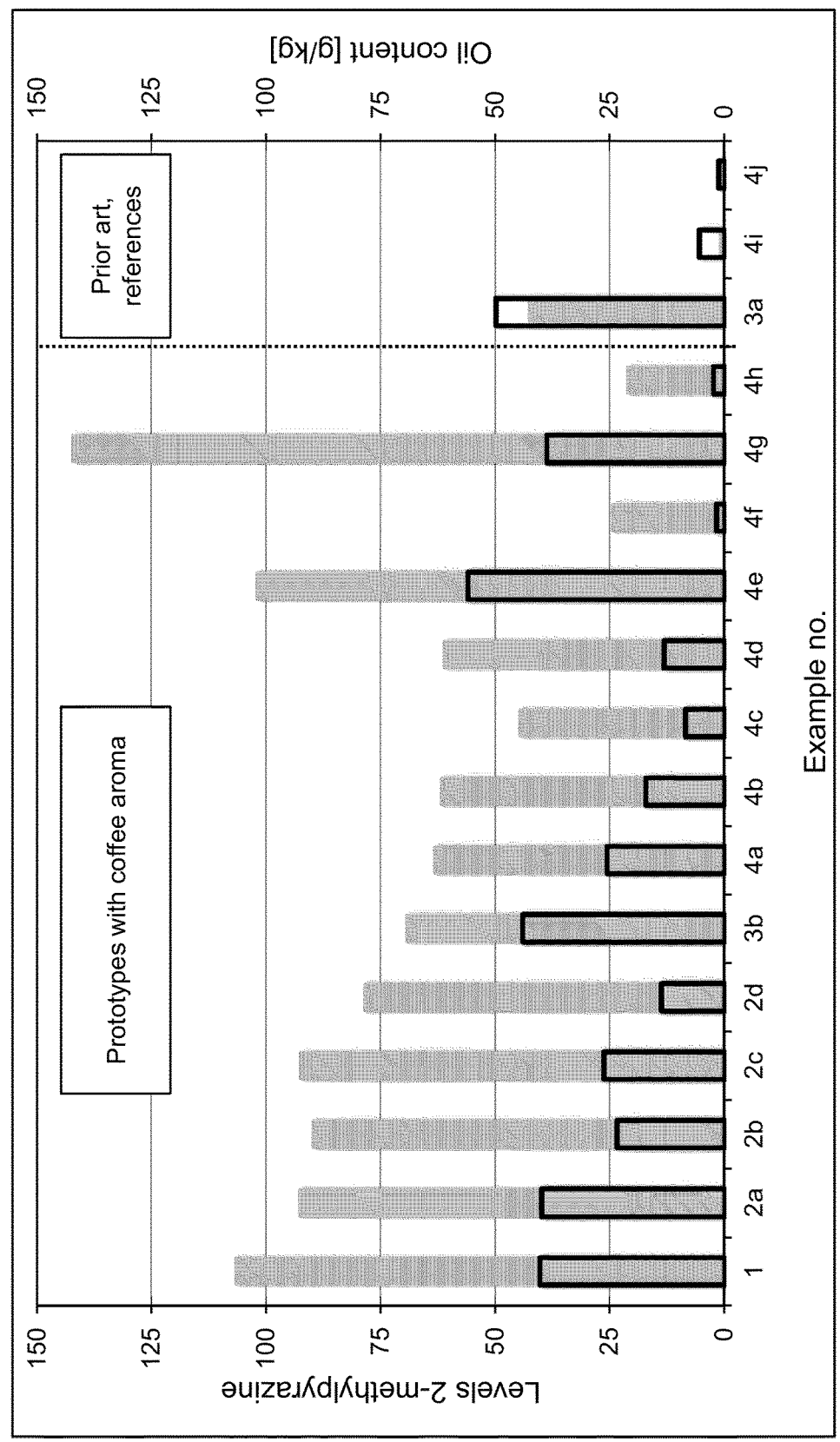

AROMA-RETAINING SOLUBLE COFFEE

CROSS-REFERENCE TO RELATED PATENT APPLICATIONS

The present application is a continuation of International Patent Application No. PCT/NL2014/050903, filed on Dec. 23, 2014, which claims priority to European Patent Application No. 13199299.2, filed Dec. 23, 2013, all of which are incorporated herein by reference in their entirety.

FIELD

The invention pertains to making soluble coffee particles, and to an instant coffee comprising soluble coffee particles. Particularly, the invention pertains to soluble coffee particles with a well-retained aroma. The invention also pertains to a method of using whole roast coffee beans.

BACKGROUND

Coffee is a well-known drink, generally prepared as a hot water or steam extract of roast and ground coffee beans. A widespread form of coffee, is that of instant coffee. Therein the extracted coffee is turned into soluble particles (typically by spray-drying or freeze-drying). These particles can be reconstituted into liquid coffee, generally by dissolving a recommended amount of the particles in hot water.

An ongoing challenge in making soluble coffee particles, is to provide such particles that, upon dissolution in hot water, will result in a liquid coffee that resembles freshly extracted coffee as much as possible. This has been an issue for coffee producers all over the world as of the coming into existence of soluble coffee. Yet, the general consumer will be familiar with the perception, when smelling and tasting the liquid resulting from dissolving soluble coffee particles in hot water, that said liquid cannot favorably compare to freshly made coffee.

The foregoing issue has been attempted to be resolved by various improvements in the process of extracting coffee, and concentrating coffee extracts, for use in making soluble coffee particles. A particularly useful process, e.g., is that disclosed in WO 2007/043873, which results in better aromas.

A particular desire in providing an instant coffee resides in making soluble coffee particles that generate a smell that is comparable to that of freshly roasted coffee. In this respect a method has been proposed in U.S. Pat. No. 1,836,931 to impart coffee aroma to soluble coffee. In this method, soluble coffee granules are mixed with freshly roasted coffee. The soluble coffee granules and the freshly roasted coffee are maintained in intimate contact for some time, and thereafter separated. The freshly roasted coffee in U.S. Pat. No. 1,836,931 is preferably ground. The time during which the intimate contact takes place is typically 24 hours.

The method as disclosed in the foregoing reference, however, comes with a drawback in that it provides the soluble coffee particles with only a low content of aroma, and particularly of 2-methylpyrazine. Also, in respect of the aforementioned ancient disclosure of 1931, an improvement is desired in respect of the preservation of aromas upon storage of the soluble coffee.

In EP 0 144 785, a drawback of the process disclosed in U.S. Pat. No. 1,836,931 is recognized, in the sense that the roast and ground coffee is difficult to separate from the instant coffee to be aromatized (i.e., the soluble coffee particles). The teaching of EP 0 144 785 therefore concerns a process that transfers volatile aromas from roast and ground coffee by heating, whilst the roast and ground coffee is out of contact with the instant coffee. This, however, is less desired from a process point of view, as it requires energy for heating. Also, it requires installing equipment not normally present in coffee production, to allow evaporated aromas from the roast and ground coffee to be transferred to the soluble coffee particles. In EP 0 144 785 it is further taught to add an amount of oily substance to the instant coffee, in order to improve the retention of aroma. The addition of oil is not desired, as this could change the appearance of the liquid coffee obtained by reconstitution of the soluble coffee particles. Also from a regulatory perspective, it is not generally desired to add foreign substances to coffee particles.

SUMMARY

In order to better address one or more of the foregoing desires the invention, in one aspect, presents a process for the preparation of aromatized soluble coffee particles, the process comprising providing soluble coffee particles, mixing the soluble coffee particles with roast whole coffee beans, holding the mixture for at least two days, and separating the beans from the soluble coffee particles.

In another aspect, the invention provides a process for the preparation of aromatized soluble coffee particles, wherein coffee aroma is comprising 2-methylpyrazine, a marker substance for the present coffee aroma according to the invention, which is believed to be a characteristic coffee aroma for fresh coffees that are appealable to the consumer. This 2-methylpyrazine is transferred to the soluble coffee particles by a method comprising providing soluble coffee particles, mixing the soluble coffee particles with roast whole coffee beans, allowing the mixture to stand for at least two days, and separating the beans from the soluble coffee particles.

In yet another aspect, the invention resides in aromatized soluble coffee particles obtainable by the above-identified process.

In a further aspect, the invention presents in instant coffee (also referred to as an instant coffee product) comprising the aforementioned soluble coffee particles, wherein the equilibrated headspace of the instant coffee comprises a level of 2-methylpyrazine of at least 1.5 ng per ml headspace, and wherein the amount of oil in the instant coffee is 0.8 to 4.5 wt. %.

In a further aspect, the invention provides a use of roast whole coffee beans for providing soluble coffee particles with additional 2-methylpyrazine aroma, by a method comprising providing a liquid coffee extract, drying the coffee extract so as to provide soluble coffee particles, mixing the soluble coffee particles with roast whole coffee beans, allowing the mixture to stand for at least two days, and separating the beans from the soluble coffee particles.

In a still further aspect, the invention presents a use of roast whole coffee beans for the purpose of improving the aroma-retention of soluble coffee particles, by a method comprising providing a liquid coffee extract, drying the coffee extract so as to provide soluble coffee particles, mixing the soluble coffee particles with roast whole coffee beans, allowing the mixture to stand for at least two days, and separating the beans from the soluble coffee particles.

BRIEF DESCRIPTION OF FIG. 1

FIG. 1 is a bar diagram showing the oil content (lining) and the 2-methylpyrazine content (filling)

DETAILED DESCRIPTION

In a broad sense, the invention is based on the judicious insight that the specific combination of a sufficiently long holding time and the use of whole beans, results in an unexpectedly great advancement in respect of aroma addition and retention for soluble coffee particles. Thus, it is surprising that such advancement with regard to addition and retention of aroma is confined to the instant coffee by soluble coffee particles obtained by the present simple and efficient process.

The soluble coffee particles of the invention, and the instant coffee of the invention comprising said particles, are indicated as being aromatized (which is a result of the method of the invention). Similarly, they are also indicated as being aroma-retaining, as the method of the invention surprisingly results not only in a favorable addition of aroma, but also in a favorable retention of such aroma. The aroma addition and retention of the soluble coffee particles of the invention extends to instant coffee comprising these particles.

The term instant coffee refers to a product comprising soluble coffee particles, from which coffee in the form of a liquid drink can be made by reconstitution with hot water. In an interesting embodiment, the instant coffee comprises a small quantity of roast and ground coffee beans (i.e., insoluble coffee particles) in addition to the soluble coffee particles. In another interesting embodiment, the instant coffee consists essentially of soluble coffee particles and roast and ground coffee. In still another interesting embodiment, the instant coffee consists of soluble coffee particles. The instant product may consist of 100% aroma-retaining soluble coffee particles according to the invention. It may also comprise a combination of soluble coffee particles according to the invention (such as soluble coffee particles treated by the aromatization method of the invention or otherwise treated so as to have the characteristics of soluble coffee particles obtainable by the method of the invention), and soluble coffee particles not according to the invention (such as untreated soluble coffee particles). For example, the instant product may comprise 90%-10% treated and 10-90% untreated soluble coffee particles, more preferably 80-50% treated and 20-50% untreated. However, most preferred is that all of the instant coffee product has been treated.

In accordance with existing practice in the art, the instant coffee according to the invention may comprise roast and ground coffee beans. If present, the amount thereof will generally not exceed 5 wt %, and will preferably be lower, as discussed below.

For completeness' sake it is added that, in connection with instant coffee, it will be understood that the terms "soluble" and "insoluble" refer to solubility in water. It will be understood that roast and ground coffee beans are not soluble in liquid water at atmospheric pressure, whether hot or cold. Soluble coffee particles are soluble in liquid water, whereby the dissolution rate is affected by the temperature, but not the solubility as such.

Further in a broad sense, the invention refers to these soluble coffee particles with such an unexpected advancement in respect of aroma due to certain constituent characteristic, such as the presence of marker compounds and the absence of compounds which impair the aroma and/or appropriate reconstitution supporting the aroma.

The holding time refers to the period during which the soluble coffee particles and the roast whole coffee beans are kept as a mixture. The mixing of the roast whole beans and the soluble coffee particles can be conducted by just putting the beans and the particles together, in an arbitrary order. Preferably, however, the mixing comprises a step wherein the beans and the particles are subjected to an act of stirring, mixing, shaking, or otherwise causing the two components to be well divided in respect of each other. The mixture can be held in any manner, but preferably in a closed container, and more preferably in an airtight container. Storage humidity is preferably below 90% RH, more preferably below 80% RH and typically about 70% RH.

The holding time is at least two days, preferably at least three days, and more preferably about one week. The holding time can be as long as desired, but preferably does not exceed one month and, more preferably, does not exceed three weeks. Longer holding times will generally not result in much additional aroma imparted on the soluble coffee particles, and shorter holding times are more practical in the process as a whole, particularly if the whole roast beans are subsequently used for grinding and extraction so as to produce soluble coffee particles. The holding time preferably is three days to two weeks, more preferably four to ten days.

The temperature at which the mixture is held is not particularly critical. It is preferred that the temperature is in a range running from above zero to 50° C., preferably from 4° C. to 25° C. Most preferably, room temperature (18° C. to 25° C., preferably 20° C. to 23° C.) is applied. In an interesting embodiment, soluble coffee particles of a relatively low temperature (0° C. to 10° C., preferably 4° C. to 6° C.) are combined with whole roast beans of a relatively high temperature (30° C. to 50° C., preferably 35° C. to 40° C.).

The invention is based on mixing soluble coffee particles with roast coffee in the form of roast whole beans. Preferably the roast coffee consists essentially of such roast whole beans. I.e., whilst it would not be practical to exclude presence of the occasional broken bean, as one or more beans might always accidentally become broken, the invention is based on the selection of roast coffee in the form of whole beans. Residual broken beans, fragments or other associated particulate bean matter which has previously been roasted and which is not soluble, is subsumed as roast and ground coffee beans in the context of the present invention. If such roast and ground coffee beans are present in the final product, i.e. the instant coffee comprising the aromatized soluble coffee particles, an insoluble residue might remain after reconstitution which is both unpleasant for the consumer and gives an off-taste in the final brew. Without wishing to be bound by theory, the inventors believe that over-extraction of the insoluble residue might causes this perceived off-taste. Hence, the instant coffee according to the present invention comprises such roast and ground coffee beans in an amount not exceeding 5 wt. % Preferably this amount will not exceed 3 wt %, more preferably it will not exceed 1 wt. %, and still more preferably it will be at most 0.5 wt. %. Most preferably the amount is below the detection threshold. Hence, the absence of such roast and ground coffee beans in the present instant coffee is preferred.

Without wishing to be bound by theory, the inventors believe that the type of aromas (essentially only volatiles) generated from whole beans, is better suited for providing soluble coffee with a sustainable aroma, than the type of aromas that is transferred, particularly with oil, from roast and ground coffee beans. Also, the process of the invention results in a more favorable ratio of aroma to oil, as evidenced with reference to 2-methylpyrazine. In this regard, the process of the present invention results in soluble coffee particles that provide instant coffee with an amount of oil of 0.8 to 4.5%, preferably 1.0 to 4.3%. It is surprising that such particles with the specified characteristics, which decisively contribute to the addition and retention of the aroma of the instant coffee, are obtained by the claimed process.

The instant coffee comprising the soluble coffee particles in accordance with the invention, has another remarkable advantage. This relates to the retention of aroma during so-called open shelf-life. Obviously, in the practical use of instant coffee, a container (e.g. a glass jar) will be opened by a consumer, and then used for some time (days or weeks) until the container is empty. After the first time opening, the shelf-life of the product is further referred to as "open shelf life". It is well known that coffee aromas will more quickly be reduced once the open shelf life has commenced. An advantage of the instant coffee according to the invention is that it shows a better retention of aroma, particularly as evidenced in respect of 2-methyl pyrazine, also during open shelf-life.

The roast whole coffee beans are preferably roasted shortly before use. In general, once roasted the beans will be kept no longer than one month before being mixed with soluble coffee particles, preferably less than a week, more preferably less than a day.

The whole roast coffee beans and the soluble coffee particles can be mixed in a wide range of ratio's. Preferably, the weight ratio of roast coffee beans to soluble coffee particles is less than 5:1, more preferably of from 4:1 to 1:4, preferably 3:1 to 1:3, and most preferably 2:1 to 1:2.

The coffee beans used can be of any type. The main coffee species used are *Arabica* beans and *Robusta* beans. Typically, mixtures of both can be used. These beans can be recognized as having a specified geographical origin, such as Brazil, Colombia, or Indonesia. The soluble coffee particles can be made by extraction from roast and ground coffee beans of any type. The soluble coffee particles can be produced from decaffeinated beans.

In an interesting embodiment, the soluble coffee particles are made by extraction from roast and ground coffee beans that, before grinding, have been used in the method of the invention, to impart coffee aroma to a previously produced batch of soluble coffee particles.

The soluble coffee particles can be provided off the shelf, and then subjected to the process of the invention. Preferably, however, the invention is realized in a coffee production plant that produces both the soluble coffee particles and the roast whole coffee beans. In this embodiment, the invention pertains to a process for the preparation of aromatized soluble coffee particles, the process comprising providing a liquid coffee extract, drying the coffee extract so as to provide soluble coffee particles, mixing the soluble coffee particles with roast whole coffee beans, holding the mixture for at least two days, and separating the beans from the soluble coffee particles. Hereby, the preferences for holding times and ratio's are as mentioned before.

The soluble coffee particles can be obtained from a liquid coffee extract by any concentration technique by which water is removed from said extract, particularly a coffee concentrate. These techniques generally are, e.g., freeze concentration, evaporation, or nanofiltration. This includes spray drying, drum drying, freeze drying, or extrusion. The dried soluble coffee particles generally have a residual moisture content in the range of from 1 wt. % to 5 wt. %, preferably 2 wt. % to 4%, most preferably about 3.5%.

In addition to the specific step of the invention according to which the soluble coffee particles are aromatized, any other techniques available to the skilled person can be applied in order to add aromas to the soluble coffee particles. E.g., in making soluble coffee particles, it is possible to apply process streams by which aromas are obtained from coffee beans and/or from a coffee extract, and recirculate these aromas to the soluble coffee particles.

A preferred process comprises producing a dried (particularly spray-dried or freeze-dried) coffee concentrate, wherein the concentrate is produced in accordance with the teaching in WO 2007/043873 or EP-A-0 352 842.

The specific surface area of conventionally produced soluble coffee particles is generally in the range of 0.1 to 0.3 $m^2/gm$. In an interesting embodiment, soluble coffee particles having a microporous structure may be used to promote adsorption of the aromas from the roast whole coffee beans.

In a preferred embodiment of the invention, in all its aspects, the soluble coffee particles are obtained via freeze-drying.

The coffee employed as a source for the extract from which the soluble coffee particles are made, as well as the whole roast coffee beans employed to impart aroma onto the soluble coffee particles, can be of the same or of a different roast. In connection with the embodiment wherein the whole roast beans, after being used for aroma generation according to the invention, are thereafter used for extraction, all coffee used is preferably of the same roast.

The method of the invention, as substantially described hereinbefore, is particularly suitable for aromatizing soluble coffee particles with coffee aromas such that a detectable quantity of 2-methylpyrazine is present. Although 2-methylpyrazine is not the only aroma provided to the soluble coffee particles, it is believed to be a characteristic coffee aroma for fresh coffees that are appealable to the consumer.

In connection herewith, it is important that the actual content of 2-methylpyrazine in the soluble coffee particles has a significant impact on the aroma of the instant coffee. As it is commonly known in the art, aroma refers to chemical compounds that have a smell or odor, and thus affect both the sense of taste and smell. Hence, in the context of the present invention, an aroma is a chemical compound which has a smell or odor because it is sufficiently volatile to be transported to the olfactory system in the upper part of the nose. Generally molecules meeting this specification have molecular weights of below 300. In particular, 2-methylpyrazine is such a volatile compound. It is generally accepted in the art to quantify such a compound in the headspace, i.e. the gaseous constituents of a closed space above liquids or solid emitting and vapors measured using headspace chromatography. Accordingly, the equilibrated headspace of the soluble coffee particles is measured which comprises at least 1.5 ng per ml headspace of 2-methylpyrazine, preferably at least 1.75 ng per ml headspace of 2-methylpyrazine, and most preferably at least 2.0 ng per ml headspace of 2-methylpyrazine.

Hence, the present invention also concerns a product, i.e. the instant coffee comprising the soluble coffee particles as describes herein, in particular characterized by their surprisingly high content in 2-methylpyrazine of at least 1.5 ng per ml headspace of 2-methylpyrazine, preferably at least 1.75 ng per ml headspace of 2-methylpyrazine, and most preferably at least 2.0 ng per ml headspace of 2-methylpyrazine.

In another aspect, the product is additionally characterized by the soluble coffee particles having an amount of oil of 0.8 to 4.5 wt. %, preferably 1.0 to 4.3 wt. %.

It is a further important finding that the so characterised product of the present invention is capable to maintain these characteristics when stored which is representative for maintaining the desired improved aroma of the instant coffee. The product characteristics are maintained at least 3 months after preparation, preferably at least 6 months and even more preferably at least 24 months.

In connection with the foregoing, the invention also concerns a process for the preparation of aromatized soluble coffee particles, wherein coffee aromas comprising 2-methylpyrazine is transferred to the soluble coffee particles by a method comprising providing soluble coffee particles, mixing the soluble coffee particles with roast whole coffee beans, allowing the mixture to stand for at least two days, and separating the beans from the soluble coffee particles. The foregoing embodiments and preferences, such as for holding time and ratio's, equally apply to this process.

It is further preferred that the aromas, as evidenced by 2-methylpyrazine, are present in relatively high amounts compared to oil present.

In yet another aspect, the invention resides in aroma-retaining soluble coffee particles obtainable by a process as substantially described, in any of the embodiments, hereinbefore.

The invention also provides a new use of roast whole coffee beans. This is for providing soluble coffee particles with additional 2-methylpyrazine aroma, by a method as substantially described hereinbefore. In a still further aspect, the invention presents a use of roast whole coffee beans for the purpose of improving the aroma-retention of soluble coffee particles. This is realized by a method comprising providing a liquid coffee extract, drying the coffee extract so as to provide soluble coffee particles, mixing the soluble coffee particles with roast whole coffee beans, allowing the mixture to stand for at least two days, and separating the beans from the soluble coffee particles. The novel uses according to the invention, are preferably realized by means of any one of the embodiments of the methods described hereinbefore.

The roast whole coffee beans in all of the aspects and embodiments of the invention can be of a light roast, of a medium roast, or of a dark roast. These terms have a known meaning to the skilled person. Preferably, the whole roast beans are of a dark roast.

The invention will be further illustrated with reference to the following, non-limiting examples.

Example 1

A batch of roasted *Arabica* beans was ground and from this ground coffee an extract was obtained according to WO2007/043873. This extract was concentrated and further freeze-dried to obtain soluble coffee particles. The yield of the process was approximately 45-50%, meaning that 2 kilograms of roasted coffee beans yields 1 kilogram of soluble coffee particles.

The batch of soluble coffee particles was homogeneously mixed with a batch of roasted *Arabica* coffee beans in a weight ratio of coffee beans to soluble coffee particles of 2:1, and packed in an airtight container. The mixture was allowed to stand at 23° C. for 7 days. After 7 days of standing time the container was opened and the mixture was separated over a sieve to yield 1950 gram of whole coffee beans and 1040 grams of soluble coffee particles.

The soluble coffee particles were packaged in an airtight container. After 3 months of storage at 23° C. the smell of the soluble coffee particles was assessed by a team of sensory experts. The smell of the soluble coffee particles was described as having roasted coffee notes. This was contributed to an increased level of 2-methylpyrazine.

The soluble coffee particles had an oil concentration of 40 g/kg soluble coffee particles.

The separated whole coffee beans were assessed as fit for extraction and where extracted according to WO2007/043873 to yield a liquid extract. This liquid extract could again be used to prepare soluble coffee particles.

Example 2

In an experimental set-up as in Example 1, using 100% *Arabica* coffee, variations are made with respect to the ratio between whole roast beans and soluble coffee particles and the holding time, as summarized in Table 1 below.

TABLE 1

| Example | Roast time beans (minutes) | Weight ratio beans:particles | Holding time (days) | Smell |
|---|---|---|---|---|
| 1 | 5.5 | 2:1 | 7 | (+) |
| 2a | 5.5 | 2:1 | 3 | (+) |
| 2b | 5.5 | 1:1 | 3 | (+) |
| 2c | 5.5 | 1:1 | 7 | (+) |
| 2d | 5.5 | 1:2 | 7 | (+) |

*)all examples are based on soluble coffee having a storage time of 3 months.

All examples result in soluble coffee particles that were evaluated positively in respect of smell, as having clear roasted coffee notes.

Example 3

This example concerns a comparison with U.S. Pat. No. 1,836,931. In accordance with the teaching thereof, a coffee blend of 46% *Arabica* and 54% *Robusta* was subjected to roasting and grinding, extraction and spray drying, so as to provide soluble coffee particles.

(a) A portion of the soluble coffee particles was mixed with a portion of roast and ground coffee having the above-mentioned blend, so as to have a ratio of roast and ground coffee to soluble coffee of 5:1. The mixture was held for 1 day (24 hours).

(b) Another portion of the soluble coffee particles was mixed with a portion of roast whole coffee beans having the above-mentioned blend, so as to have a ratio of roast whole coffee beans to soluble coffee of 2:1. That mixture was held for 14 days (2 weeks).

The same parameters were determined as in the preceding examples. The results are shown in Table 2.

TABLE 2

| Example | Weight ratio beans:particles | Holding time (days) | Smell |
|---|---|---|---|
| 3(a) | 5:1 | 1 | (−) |
| 3(b) | 2:1 | 14 | (±) |

Example 4

This example concerns a comparison for the ratio between 2-methylpyrazine and oil in soluble coffee particles. The samples include the foregoing examples, as well as other samples produced in the same way, yet with further differentiation as to the type of coffee beans, the roasting process, and the drying process. An overview of the samples is given in Table 3 below.

The samples were qualitative analysed by means of GC-MS as follows:
0.5 gram of instants coffee was weighted into a 10 mL vial.
The sample was equilibrated for 15 minutes at 40° C.
The headspace sample was concentrated using a 2.5 mL SPDE syringe
1 mL of the content of the syringe was desorbed on a Trace Quadrupole GC-MS.
GC analysis was conducted split less in full scan mode using a Varian VF-1 ms 30 m×0.25 mm×1 um column.
2-methylpyrazine was identified by means of reference standard, and peak areas were reported. Differences between analysis runs were corrected with a reference sample from the previous runs.

Method to Determine Oil Level

The oil levels were determined by means of a Soxhlet extraction. Therefore 5 gram of instant coffee was dissolved in 150 mL of boiling water and the obtained solution was passed over a filter with 6 g celite 545. The filter was collected and dried for 16 hours at room temperature and 1 hour in a drying stove operating at 103° Celcius.

Subsequently, the dried filter was collected in an extraction thimble from Schleicher & Schuell BioScience GmbH and 150 mL hexane was added as extraction medium. The sample was extracted and dried with a Gerhart Soxterm operating at 180° C. The dried product was weighted and the oil level was expressed in gram per 100 gram of instant coffee.

The columns in Table 3 have been indicated with letters A to H as follows:
A=Example Number
B=Weight ratio beans:particles
C=Holding time (days)
D=Drying method: spray-dried (S) or freeze-dried (F)
E=Bean composition (a) *Arabica*(%); (b) *Robusta* (%)
F=Roast type
G=Roast time (minutes)
H=Form of roast beans: whole (W) or ground (G)

TABLE 3

| A | B | C | D | E (a) | E (b) | F | G | H |
|---|---|---|---|---|---|---|---|---|
| 1 | 2:1 | 7 | F | 100 | 0 | Dark | 5.5 | W |
| 2a | 2:1 | 3 | F | 100 | 0 | Dark | 5.5 | W |
| 2b | 1:1 | 3 | F | 100 | 0 | Dark | 5.5 | W |
| 2c | 1:1 | 7 | F | 100 | 0 | Dark | 5.5 | W |
| 2d | 1:2 | 7 | F | 100 | 0 | Dark | 5.5 | W |
| 3b | 2:1 | 14 | S | 46 | 54 | Dark | 5.5 | W |
| 4a | 2:1 | 1 | F | 100 | 0 | Dark | 5.5 | W |
| 4b | 1:1 | 1 | F | 100 | 0 | Dark | 5.5 | W |
| 4c | 1:2 | 1 | F | 100 | 0 | Dark | 5.5 | W |
| 4d | 1:2 | 3 | F | 100 | 0 | Dark | 5.5 | W |
| 4e | 2:1 | 13 | F | 100 | 0 | Dark | 5.5 | W |
| 4f | 2:1 | 13 | F | 100 | 0 | Light | 5.5 | W |
| 4g | 2:1 | 13 | F | 0 | 100 | Dark | 5.5 | W |
| 4h | 2:1 | 13 | F | 0 | 100 | Light | 5.5 | W |
| 3a | 5:1 | 1 | S | 46 | 54 | Dark | 5.5 | G |
| 4i | — | — | S | — | — | — | — | — |
| 4j | — | — | F | — | — | — | — | — |

The results are depicted in FIG. 1, which is a bar diagram showing the oil content (lining) and the 2-methylpyrazine content (filling). All 2-methylpyrazine levels are expressed in peak areas divided by $10^7$.

Example 5

This example concerns the determination of a set of characteristics which significantly contribute for the final good and long retained aroma of the instant coffee according to the present invention. Therefore, quantitative levels of marker substance 2-methylpyrazine and the percentage oil level in the soluble coffee particles in instant coffee particles are determined by means of the analytic oil method as described above and the quantitative 2-methylpyrazine method as described below.

Quantitative Analytical Method for 2-Methylpyrazine

2-Methylpyrazine headspace concentrations were determined by means of an indirect external calibration of the headspace concentration using a reference standard of 2-Methylpyrazine. Therefore a working solution of 1096 mg per liter 2-Methylpyrazine was obtained by dissolving 2-Methylpyrazine in pentane. This working solution was further diluted with pentane to obtain 6 calibration solutions of 7 µg/ml up to 1096 µg/ml. A calibration curve was made by liquid injection of 1 µL of the diluted working solutions on a simulated on-column PTV injector.

Subsequently, the headspace concentration of a known 2-Methylpyrazine solution was determined by dissolving 610 mg per 50 mL of the standard 2-Methylpyrazine in polyethyleenglycol. This stock solution was 10 times diluted with water and from this solution 300 µL was added to 2700 µL water into a 20 mL vial and equilibrated for 15 minutes at 30° C. The headspace concentration of the known 2-Methylpyrazine solution was determined by injecting 1 mL of the static headspace above the solution and calculating the liquid/headspace partition coefficient. From the liquid/headspace partition coefficient the concentration 2-Methylpyrazine in ng/mL headspace (HS) was calculated.

Quantification was performed with SPDE-HS-GC-FID using a Agilent VF-WAXms 30 m×0.25 mm×1 µm column. Therefore 4 gram of instant coffee was weighted into a 20 mL vial and the sample was equilibrated for 15 minutes at 30° C. The headspace of the sample was concentrated using a 2.5 mL SPDE syringe and 1 mL of the content of the syringe was desorbed on a GC-FID.

The samples include the foregoing examples, yet with further differentiation as to the above specified characteristics, including reference samples according to U.S. Pat. No. 1,836,931. Other samples are added, based on Example 4, and further having the following manufacturing characteristics:

Example 5a: weight ratio beans:particles of 1:2, holding time of 6 days;
Example 5b: weight ratio beans:particles of 1:1, holding time of 7 days.

The results are depicted in Table 4.

The columns in Table 4 have been indicated with letters A and I to L as follows:
A=Example Number
I=Marker level [ng/ml head space] at t=0
J=Oil level in instant coffee [wt. %] at t=0
K=Marker level [ng/ml head space] after 3 months storage time
L=Roast & Ground in instant coffee (%)

TABLE 4

| A | I | J | K | L |
|---|---|---|---|---|
| 1 | 4.41 | 4.3 | 3.70 | 0.08 |
| 2a | 3.57 | 4.4 | 3.11 | 0.09 |
| 2b | 2.55 | 2.3 | 1.98 | 0.06 |
| 2c | 3.38 | 2.3 | 3.01 | 0.06 |
| 2d | 2.26 | 2.0 | 1.85 | 0.06 |
| 3b | 1.76 | 4.3 | 1.83 | 0.18 |
| 4a | 2.10 | 2.1 | 1.69 | 0.09 |

TABLE 4-continued

| A | I | J | K | L |
|---|---|---|---|---|
| 4b | 1.63 | 1.8 | 0.81 | 0.06 |
| 4c | 1.28 | 0.7 | 0.71 | 0.05 |
| 4d | 1.95 | 1.7 | 1.12 | 0.04 |
| 3a | 0.75 | 5.6 | 0.90 | 3.47 |
| 4i | 0.08 | 0.4 | 0.19 | 0.05 |
| 4j | 0.03 | 0.3 | 0.04 | 0.05 |
| 5a | 2.49 | 1.4 | n.d. | 0.12 |
| 5b | 5.06 | 2.7 | n.d. | 0.13 |

These results show, that the method of the present invention leads to a product which fulfils the quantitative requirements with regard to the specific characteristics which were found to be decisive for the aroma of instant coffee.

This becomes even more evident when the characteristics of the instant coffee according to the present invention are compared to those corresponding characteristics of product according to the prior art U.S. Pat. No. 1,836,931.

The results of the product according to the prior art U.S. Pat. No. 1,836,931 clearly indicate that such a product, which has not been prepared according to the present invention, does not at all fulfil the characteristics which are required to obtain an instant coffee with a particular good and retained aroma.

Example 6

This example concerns the determination of a further characteristic which contributes to the good aroma and the reconstitution ability of the instant coffee, i.e. the percentile content of roast and ground coffee in the instant coffee. As explained above, roast and ground coffee is insoluble in contrast to the soluble coffee particles, and is determined by physical separation from the coffee solution by art-known means and then gravimetrically analysed.

Method R&G Parts in Instant

The contents R&G parts in instant coffee were determined by means of a filtration. Depending on the amount of roast and ground coffee in the instant coffee, 1-10 gram instant coffee was dissolved in 200 mL of boiling demineralized water and was kept at 95° Celcius for 20 minutes. Subsequently, the coffee solution was passed over a dried nylon filter with a known weight and a mesh size of 15 µm (Kabel Zaandam) using a Sartorius stainless steel pressure filter holder with a diameter of 50 mm and a content of 200 mL.

The filter was collected and dried for 1 hour in a drying stove operating at 103° Celcius. The dried product was weighted and the content R&G parts was expressed in gram per 100 gram of instant coffee.

An instant coffee prepared according to the present invention involving a coffee beans to coffee particle ratio of 1:1 and a holding time of 7 days exhibited a content of roast and ground coffee in the instant coffee of only 0.13 wt. %, which is below the lower envisaged limit of 0.5 wt. % and far below what instant coffee of the prior art or marketed products typically feature.

Example 7

This example concerns the determination of aroma retention during open shelf-life of instant coffee. A test is conducted as follows, using an initially closed and sealed container (a glass jar) comprising 200 g of instant coffee, said container provided with a reclosable cover. Directly after breaking the seal and opening the container, i.e., without delay and without any stirring of the instant coffee, the instant coffee is scooped, using a tea spoon, into three glass tubes until each tube is filled with 10 g of instant coffee. From at least one of these tubes a quantity of 4 g of instant coffee is taken, and this sample is subjected to the aforementioned quantitative analysis for 2-methylpyrazine.

After taking the quantity of coffee (which is denoted "0 OP" for an open shelf-life of zero), the instant coffee is firmly stirred with a teaspoon for a period of 10 seconds. Thereafter, the instant coffee is shaken for another period of 10 seconds, after which the cover is closed. The stirring and shaking for, in total, 20 seconds serves to replace the headspace of the instant coffee.

After 24 hours standing time, the container is opened again. Exactly the same procedure is repeated, i.e. taking a second series of three samples of instant coffee of 10 g each, stirring and shaking the instant coffee for, in total, 20 seconds, and closing the cover. A quantity of 4 g of this second series of samples of instant coffee is subjected to the aforementioned quantitative analysis for 2-methylpyrazine. The test is repeated daily from day 3 until day 6. It is noted that, as a result of the stirring and shaking, the test presents an accelerated method for open shelf-life as compared to real-life storage. I.e., it is to be expected that during the test period a reduction of the aroma can be observed.

The coffee used is prepared in analogy with that of Example 5b, with an initial oil level of 2.8 wt. %.

The results are depicted in Table 5. The letters therein have the following meaning M=Number of days open shelf-life;
N=Marker level [ng/ml head space] of quantity of instant coffee of the invention;

TABLE 5

| M | N |
|---|---|
| 0 | 5.06 |
| 1 | 3.66 |
| 2 | 3.24 |
| 3 | 2.58 |
| 4 | 1.44 |
| 5 | 0.92 |

The results show that the instant coffee of the invention retains a desired aroma level of at least 1.5 ng 2-methylpyrazine per ml headspace for at least 3 days of accelerated open shelf-life.

The invention claimed is:

1. A process for the preparation of aromatized soluble coffee particles, the process comprising
   providing soluble coffee particles,
   mixing the soluble coffee particles with roast whole coffee beans,
   holding the mixture for at least two days, and
   separating the beans from the soluble coffee particles.

2. A process according to claim 1, wherein the soluble coffee particles are provided by
   making a liquid coffee extract, and
   drying the coffee extract so as obtain soluble coffee particles.

3. A process according to claim 2, wherein the drying is freeze-drying.

4. A process according to claim 1, wherein the weight ratio of coffee beans to soluble coffee particles is 5:1.

5. A process according to claim 1, wherein the weight ratio of coffee beans to soluble coffee particles is 3:1 to 1:3.

6. A process according to claim 1, wherein the holding time is three days to two weeks.

7. A process according to claim 1, wherein coffee aroma comprising 2-methylpyrazine is transferred to the soluble coffee particles.

8. A process according to claim 1, wherein the roast whole coffee beans are of a dark roast.

9. The process according to claim 2, wherein the soluble coffee particles are provided by
   making a liquid coffee extract and
   drying the coffee extract after concentrating the extract so as to obtain soluble coffee particles.

10. A process according to claim 1, wherein the weight ratio of coffee beans to soluble coffee particles ranges from 4:1 to 1:4.

11. A process according to claim 1, wherein the weight ratio of coffee beans to soluble coffee particles ranges from 2:1 to 1:2.

12. A process according to claim 1, wherein the holding time is four to ten days.

\* \* \* \* \*